L. GLOWACKI.
COMBINATION CANE AND FISHING ROD.
APPLICATION FILED JUNE 8, 1918.
1,285,679.
Patented Nov. 26, 1918.
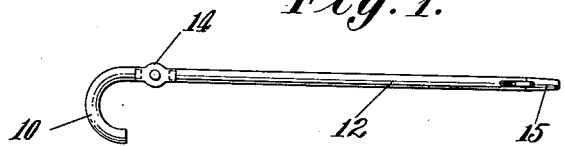
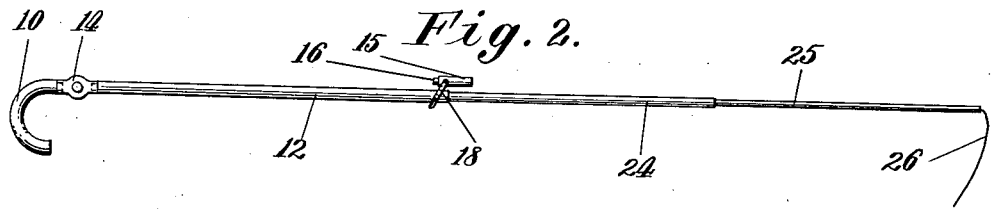
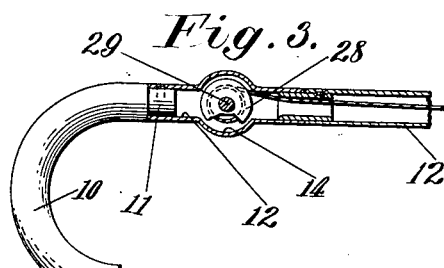
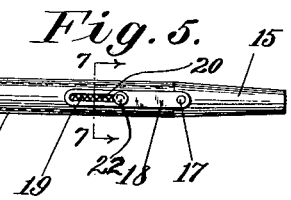
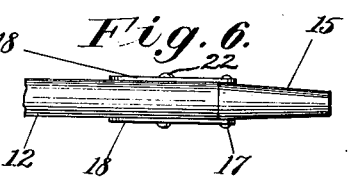
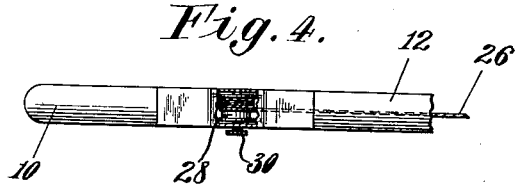
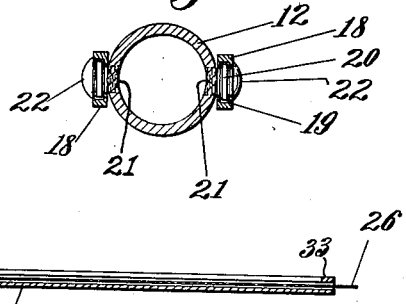
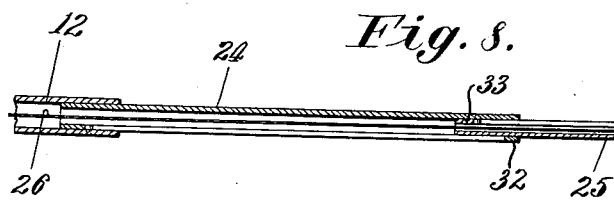
INVENTOR
Leo Glowacki.
BY
his ATTORNEY

UNITED STATES PATENT OFFICE.

LEO GLOWACKI, OF ARGYLE, MINNESOTA.

COMBINATION CANE AND FISHING-ROD.

1,285,679. Specification of Letters Patent. Patented Nov. 26, 1918.

Application filed June 8, 1918. Serial No. 238,855.

*To all whom it may concern:*

Be it known that I, LEO GLOWACKI, a citizen of Russia, residing at Argyle, county of Marshall, and State of Minnesota, have invented certain new and useful Improvements in Combination Canes and Fishing-Rods, of which the following is a specification.

This invention relates to improvements in fishing rods and has as its special object the provision of a fishing rod which may be used as a cane.

Another object is to provide an implement which may be metamorphosed from a cane into a fishing rod, or vice versa, the shank of the cane being hollow and containing telescopic elements which are extensible in length whereby the device may be used as a fishing rod.

This object is attained by the novel construction and combination of parts hereinafter described and shown in the accompanying drawing, forming a material part of this disclosure, and in which:—

Figure 1 is a side elevational view, showing an implement made in accordance with the invention.

Fig. 2 is a similar side elevational view of the same shown in an extended position as when in use as a fishing rod.

Fig. 3 is an enlarged fragmentary partial side elevational and sectional view, showing the upper portion of the implement.

Fig. 4 is a side elevational view of the same looking from another plane.

Fig. 5 is a partial plan view showing the point of the implement.

Fig. 6 is a similar side elevational view, showing the same from another plane.

Fig. 7 is an enlarged transverse sectional view, taken on line 7—7 of Fig. 5, and Fig. 8 is a longitudinal sectional view showing the parts extended at length.

The head 10 of the implement which may be made in any preferred shape is here shown to be formed with a stem 11 engaged within the tubular body 12 which is expanded near the head so as to present an annular casing 14, its axial center being transverse to the axis of the body 12, which terminates in a removable point 15, the same being of usual tapered type of construction and having at its upper end a stem 16 engageable within the open bottom of the tubular shank or body 12.

Pivotally engaged near the upper or base portion of the point 15, on pins 17, are a pair of opposed links 18 containing longitudinal slots 19, in which are positioned coiled compression springs 20, flattened after coiling, one end of the springs pressing against pins 21 set rigidly in the sides of the shank 12 and on which the links may turn, the other end of the springs extending into the slot 19 in such manner that when the point 15 be withdrawn to such an extent as to free the stem 16 from the shank, the springs are compressed, permitting the point to be turned either upwardly or outwardly as shown in Fig. 2, the links being held to the shank by the outstanding heads 22 of the pins 21.

Slidably engaged within the tubular shank 12 is an inner tube 24 which in turn incloses another tube 25, having means at its end for engagement with a fish line 26. This line passes inward through the tubes 25, 24 and 12, and may be coiled upon a drum 28, mounted upon a spindle 29, within the casing 14. One end of the spindle extends outwardly and is furnished with a corrugated operating knob 30, stops 32 and 33 being formed at the ends of the telescopic tubes whereby they are prevented from being withdrawn beyond a definite limit, while obviously the reel, actuated by the knob may be used to retract the line 26 whenever desired.

From the foregoing it will be seen that a convenient apparatus has been disclosed which may be used as an ordinary walking cane presenting no objectionable appearance or which may be metamorphosed without the use of tools into an efficient fishing rod.

Having thus described my invention what I claim as new and desire to secure by Letters Patent, is—

1. In a combined cane and fishing rod, the combination with a tubular shank and a handle rigidly engaged therewith, of a plurality of tubes telescopically received in said tubular shank, a removable point at the lower end of said shank, and means for holding said point engaged with said shank whether in an entered position or when alongside thereof.

2. In a combined cane and fishing rod, the combination with a tubular shank and a handle rigidly engaged therewith, of a point normally disposed in the opposite end of said shank, a pair of links engaged upon opposite sides of said point, said links having slots extending longitudinally at their upper ends, means for pivoting said links upon the end of said shank, resilient means inclosed in the mentioned slots whereby said links are held in a normally retracted position, and a stem formed with said point adapted to enter the lower end of said shank, said resilient means being adapted to maintain said point in intimate relation within said shank.

3. In an article as described, the combination with a tubular shank and a handle rigidly engaged therewith, of a point at the opposite end of said body, a stem formed within said point adapted to enter the lower end of said tubular shank, a pair of links pivoted to said point at one end, said links containing longitudinal slots and springs disposed in the mentioned slots adapted to draw said point into the opening in said tubular shank but permitting its withdrawal, said links being pivotally engaged with said body.

In testimony whereof I have affixed my signature.

LEO GLOWACKI.